United States Patent [19]

Yokozawa

[11] Patent Number: 4,534,012
[45] Date of Patent: Aug. 6, 1985

[54] PORTABLE PROGRAMMABLE INFORMATION DEVICE AND EXTERNAL PROGRAMMING STATION

[75] Inventor: Yukio Yokozawa, Suwa, Japan

[73] Assignee: Kabushiki Kaisha Suwa Seikosha, Tokyo, Japan

[21] Appl. No.: 558,559

[22] Filed: Dec. 5, 1983

Related U.S. Application Data

[63] Continuation of Ser. No. 283,260, Jul. 14, 1981, abandoned.

[30] Foreign Application Priority Data

| Jul. 16, 1980 | [JP] | Japan | 55-97247 |
| Jul. 31, 1980 | [JP] | Japan | 55-105305 |
| Aug. 20, 1980 | [JP] | Japan | 55-114169 |
| Mar. 2, 1981 | [JP] | Japan | 56-29557 |

[51] Int. Cl.³ .................................. G06F 15/20
[52] U.S. Cl. ........................ 364/900; 368/1; 368/10; 368/327
[58] Field of Search ... 364/200 MS File, 900 MS File

[56] References Cited

U.S. PATENT DOCUMENTS

| 3,636,520 | 1/1972 | Berteau | 364/200 |
| 4,066,848 | 11/1977 | Hyatt | 364/200 |
| 4,093,997 | 6/1978 | Germer | 364/900 |
| 4,093,999 | 6/1978 | Fuller et al. | 364/900 |
| 4,099,230 | 7/1978 | Mead | 364/200 |
| 4,115,870 | 9/1978 | Lowell | 364/900 |
| 4,117,542 | 9/1978 | Klausner et al. | 364/900 |
| 4,143,417 | 3/1979 | Wald et al. | 364/900 |
| 4,156,928 | 5/1979 | Inose et al. | 364/900 |
| 4,167,040 | 9/1979 | Heritier et al. | 364/900 |
| 4,168,533 | 9/1979 | Schwartz | 364/900 |
| 4,192,006 | 3/1980 | Hausdorff | 364/900 |
| 4,253,143 | 2/1981 | Onodera et al. | 364/200 |
| 4,277,827 | 7/1981 | Carlson et al. | 364/200 |
| 4,277,837 | 7/1981 | Stuckert | 364/900 |
| 4,280,180 | 7/1981 | Eckert et al. | 364/900 |
| 4,364,112 | 12/1982 | Onodera et al. | 364/200 |

Primary Examiner—Jerry Smith
Assistant Examiner—Gary V. Harkcom
Attorney, Agent, or Firm—Blum Kaplan Friedman Silberman & Beran

[57] ABSTRACT

A small-sized portable information system is provided including a small-sized portable information device and an external station. Both the external station and the portable information device are provided with a central processing unit, a memory device, a display device, an input device and a power supply. The portable information device and the external station can be coupled together by an electrical or optical interface to permit transfer of programs from the external station to the portable information device and exchange of data therebetween.

14 Claims, 33 Drawing Figures

FIG. 4
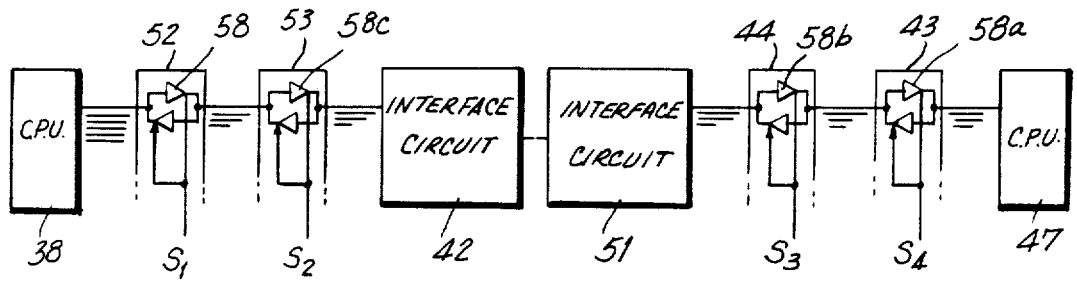
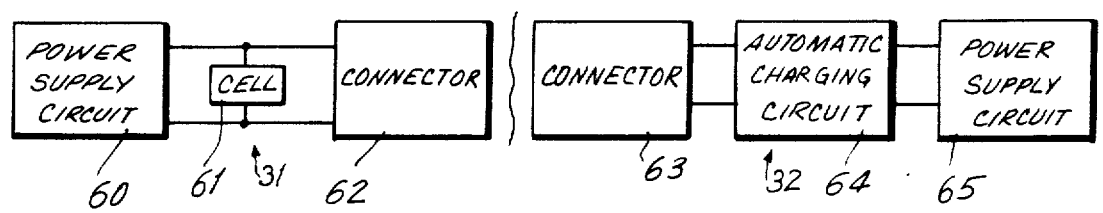
FIG. 5
FIG. 6
FIG. 7
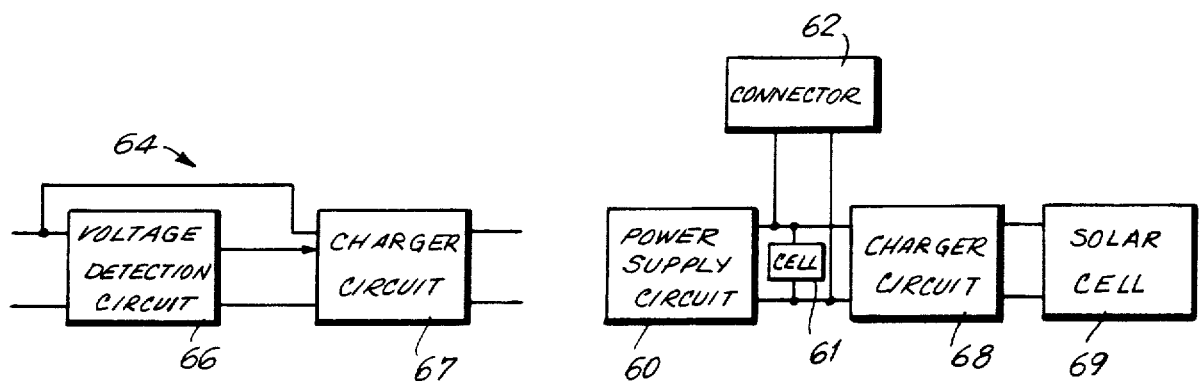

PORTABLE PROGRAMMABLE INFORMATION DEVICE AND EXTERNAL PROGRAMMING STATION

This is a continuation of application Ser. No. 06/283,260, filed July 14, 1981, now abandoned.

BACKGROUND OF THE INVENTION

This invention is directed to information systems and, in particular, to an information system which includes a portable programmable information device such as a hand-held calculator, wristwatch or the like, and an external station which can, at least, program the portable device and receive data therefrom, and an interface which can be coupled therebetween for effecting the bi-directional transfer of data and programs therebetween.

Conventional small-sized portable information devices include, for example, wristwatches, hand-held calculators and credit-card calculators. These devices are becoming smaller in size and provide a plurality of functions due to the continuing advances being made in the development of semiconductor technology. However, the functions which these devices can perform are predetermined and heretofore it has not been possible for a user to program new and different functions which the device can perform. With small-sized portable computers which the user can program in part, programming can be effected through a keyboard on the computer itself, and hence the size thereof becomes necessarily larger thereby making it difficult to carry around. Attempts to reduce the size of the keyboard results in inconvenience in programming the device.

Conventional small-sized portable information devices include, for example, programmable electronic calculators such as the YHP-25c and the TI-58c as well as wristwatches. Although the functions available on these devices are highly advanced, the programming of such functions is conventionally corrected, edited or recorded according to a pre-memorized program in the portable information device itself.

Programming by higher level languages is preferrable so that the user can effectively utilize the advanced functions. Where programming is done by a higher level language, it is required that the small-sized portable information device should have such functions as correction and edition of the program which are not required at the time of program performance. While it is of course desirable to have a portable information device which is small-sized, the conventional devices cannot use higher level languages. Additionally, program development is inconvenient since the programming is effected through a keyboard and the display of information occurs on the information device itself.

The present invention eliminates the foregoing difficulties and provides means for enabling the user to program a small-sized portable information device and also provides a system for effecting data processing in a small-sized portable information device. Accordingly, an information system which includes a portable programmable device and an external station for programming, transferring and receiving information from the portable device through an interface, is desired.

SUMMARY OF THE INVENTION

Generally speaking, in accordance with the instant invention, an information system which includes a small-sized portable device such as a wristwatch, hand-held calculator or the like and an external computer or data processing station is provided. The small-sized portable information device includes a central processing unit, a memory, a display device and an input and output device. The external station also includes a central processing unit, a memory, a display device, an input and output device and other components such as cathode ray tube, a cassette tape recorder, floppy disks and a printer. An interface provided between the portable device and the external station allows the portable device to be coupled to the external station for effecting bi-directional transfer of data, programs, etc. therebetween. The portable device can be programmed through the external station and data from the portable device can be transferred to the external station.

A user determines the functions which the portable device is to perform and develops the necessary computer program therefor. The computer program is programmed in the external station which in turn programs the portable device when the portable device is set in the interface to perform the predetermined functions. The portable device can be carried around and will perform the pre-programmed functions such as data collection and the like. The data collected by the portable device can then be transferred through the interface to the external station where the data can be processed in accordance with desired results.

The interface between the portable device and the external station can be either optical or electrical for effecting bi-directional transfer of programs and data therebetween. The external station may include a charging device which recharges the portable device when the portable device is interfaced with the external station.

Accordingly, it is an object of the instant invention to provide an improved information system.

Another object of the invention is to provide an information system which includes a programmable portable device and an external station for programming the device.

Yet another object of the instant invention is to provide a programmable portable device which can be programmed through an external station such as a personal computer.

A further object of the instant invention is to provide an information system which includes a portable data collecting device and an external station for receiving the data collected and for processing the data.

A still further object of the invention is to provide a portable information device which can be programmed by an external station where the external station can receive data collected by the portable device and process that data.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a block circuit diagram of the signal switching circuit depicted in FIG. 3;

FIG. 5 is a block circuit diagram of an automatic charging system used in the present invention;

FIG. 6 is a block circuit diagram of an automatic charging circuit for the information system;

FIG. 7 is a block circuit diagram of a solar cell mechanism used for recharging the portable device;

DESCRIPTION OF THE PREFERRED EMBODIMENTS

Figure 1:
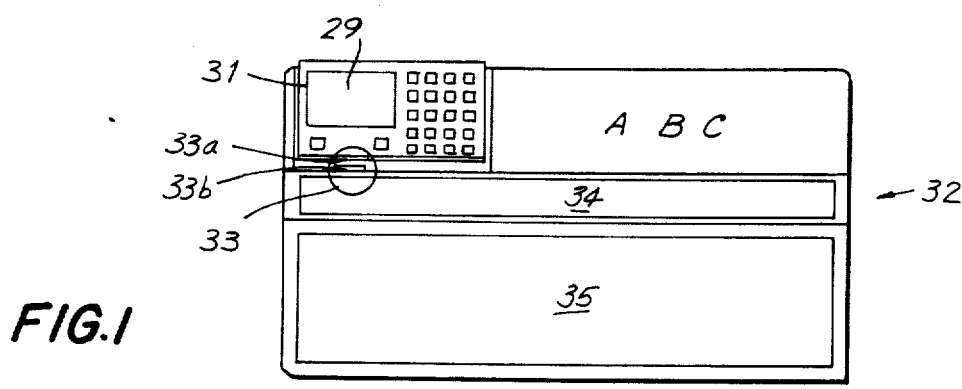
FIG. 1 is an elevational view of an information system including a portable device and an external station constructed in accordance with the instant invention.

Reference is first made to FIG. 1 which depicts a portable information system constructed according to the present invention. A small-sized portable information device 31, such as a credit-card calculator or the like, is depicted coupled to an external station 32, such as a home personal computer or the like. An interface 33, such as an optical or electrical interface, allows for bi-directional transfer of programs and data between information device 31 and external station 32. Interface 33 consists of interface element 33a mounted on portable information device 31 and interface element 33b mounted on external station 32. Interface elements 33a and 33b are in registration and coupled (optically or electrically) when portable information device 31 is received in external station 32.

As more fully discussed below, portable device 31 includes a central processing unit, a memory, a display device 29 such as a dot matrix LCD, an input and output device and a power supply. Information device 31 performs functions which include the control of display 29 and of the input and output device by means of a basic program stored in a ROM incorporated in the memory thereof and a program that the user has prepared and stored in a RAM likewise incorporated in said memory. The basic program comprises subroutines for a variety of conventional operations such as the operation of a calculator and a clock and a program for calling the subroutines. A user can easily prepare a control program and change and add functions to be performed by the information device 31 merely by preparing the program which calls the subroutines or by preparing a program for a new function. Such a program can be easily prepared by the user on external station 32 since external station 32 includes a standard size display device 34 and a keyboard 35 which are easily used. Once prepared, the program may be loaded in the RAM of the information device 31 through interface 33, greatly enhancing the flexibility of the information device.

External station 32 also includes a central processing unit, a memory, a display device 34 such as a dot matrix LCD, an input and output device including keyboard 35, a power supply and an interface element 33b. External station 32 may also include a cathode ray tube (CRT), a cassette tape recorder, floppy disks and a printer.

Since external station 32 has an increased ability for file processing, there is no need for portable information device 31 to be programmed and function for editing and correcting the program and hence no program development needs to be effected in information device 31. Therefore, information device 31 can be small-sized and at the same time it remains easy to develop, correct, register and cancel the program thereof. Using the information system of the present invention, it is possible to use information device 31 as a data collection terminal where data is collected therein and which can thereafter be transferred via interface 33 to external station 32 for easy print-out and filing.

Figure 2:
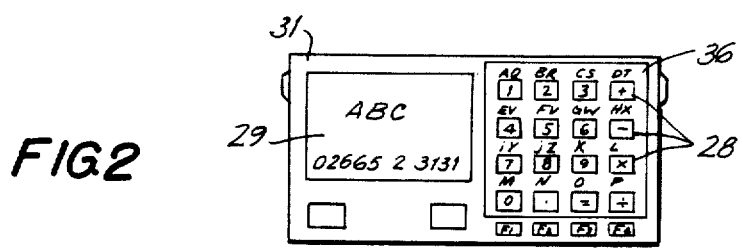
FIG. 2 is a front elevational view of the portable device depicted in FIG. 1.

Referring now to FIG. 2 in addition to FIG. 1, an example using the system of the present invention will now be described. In the example under consideration, a list of telephone numbers is programmed in accordance with the present invention in external station 32. As aforenoted, information device 31 includes a display 29 and may also include a replaceable adhesive printed label 36 which fits over buttons 28 to indicate the data which can be entered by each button in performance of the telephone directory function. Label 36 is replaceable so that it can be changed if another program is programmed in the device.

In the example under consideration, external station 32 is used to register and file names and telephone numbers and the data and the program for control of information device 31 are transferred through interface 33 to device 31 which can then be carried by the user as desired. In order to register a new name and telephone number, that information is temporarily stored in information device 31 which can then be set in the external station 32 for change of the filing. Retrieval of information from the file stored in the RAM is accomplished through buttons 28. Additionally, the owner's name, address, telephone number, blood type, a list of addresses and a dictionary can similarly be registered and stored for display by the information device 31. Particularly, a necessary number of words can freely be stored in the RAM for effective use on the system, permitting build up of word power in the information device. In addition, programs can be prepared on the system for almost all functions such as games, world time function calculations, statistical calculations, schedule maintenance and the like.

Figure 3:
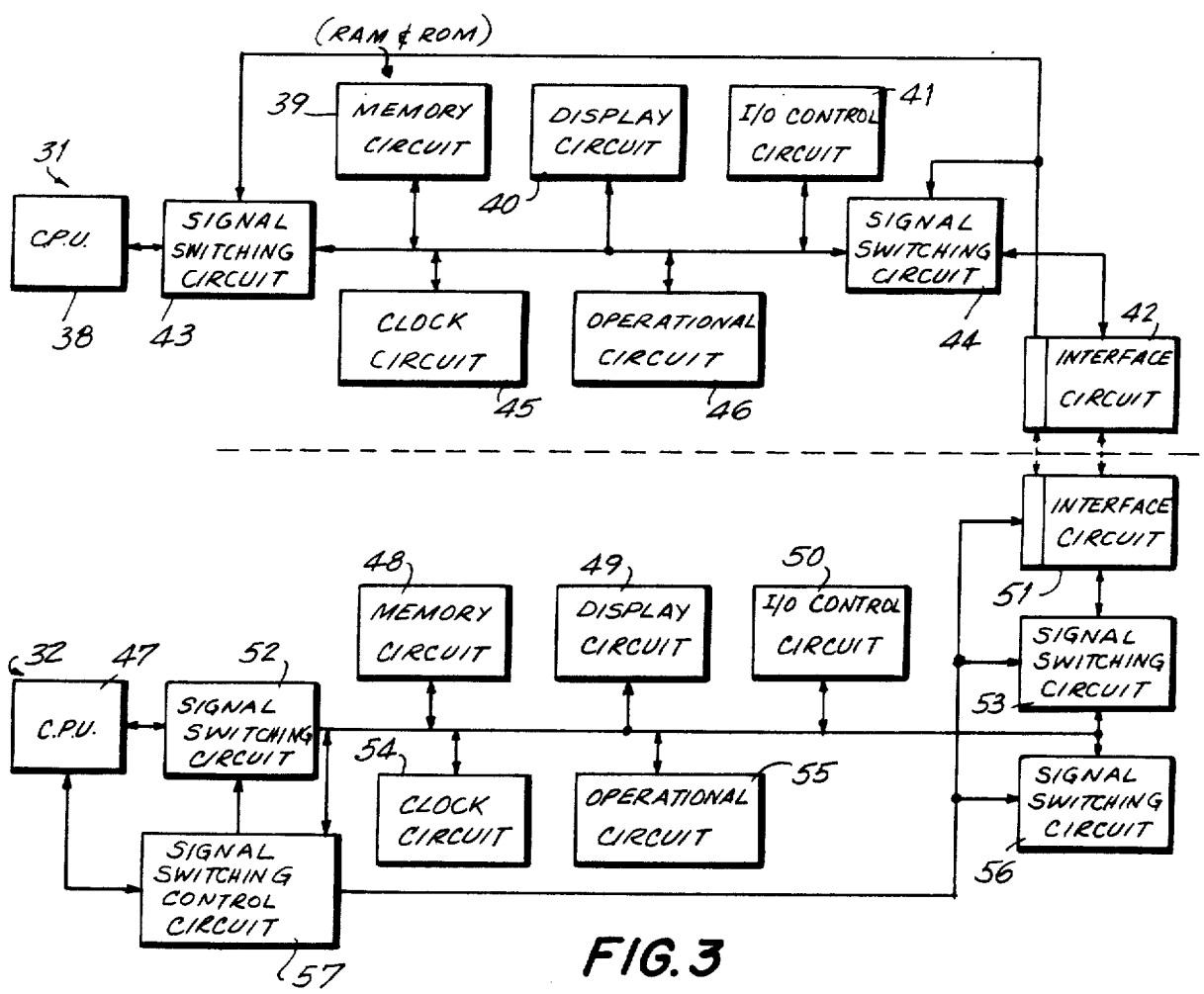
FIG. 3 is a block circuit diagram depicting the circuit construction of the external station and the portable device depicted in FIG. 1.

Referring now to FIG. 3, the construction of portable information device 31 and external station 32 will be explained. Portable device 31 includes a central processing unit 38, a memory circuit 39 including both the RAM and the ROM, a display circuit 40 including display 29, an input and output control circuit 41 including a keyboard such as buttons 28, an interface circuit 42 including interface element 33a which interfaces with external station 32, signal switching circuits 43 and 44, clock circuit 45 and operational circuit 46. Components 38 through 46 plus a power supply circuit form the small-sized portable information device 31.

External station 32 includes a central processing unit 47, a memory circuit 48, a display circuit 49 including display 34, a control circuit 50 for input and output devices such as a CRT and a keyboard 35, an interface circuit 51 including interface element 33b for coupling with interface circuit 42 of portable device 31, signal switching circuits 52, 53 and 56, clock circuit 54, operational circuit 55 and signal switching control circuit 57. Clock circuit 45 of portable device 31 and clock circuit 54 of external station 32 are clock circuits into and out of which data is supplied.

Operational circuit 46 of portable device 31 and operational circuit 55 of external station 32 are used for computing functions and are of conventional design. Signal switching circuits 43, 44, 52, 53 and 56 serve to switch address and data signals upon data transfer between portable device 31 and external station 32 and, during this operation, are essentially controlled by signal switching control circuit 57. Signal switching circuits 43 and 52 also switch address and data signals during operation of the respective devices 31 and 32.

FIG. 4 depicts the signal switching circuits. Signal switching circuit 52 includes a three-state clock gate 58 which produces a high impedance output when a signal $S_1$ in the high state is applied. Similarly signal switching circuits 43, 44 and 53 include three-state clock gates 58a, 58b and 58c, respectively, which produce high impedence outputs when signals $S_4$, $S_3$ and $S_2$ are in the high state. Table 1 shows the control states of signals $S_1$, $S_2$, $S_3$ and $S_4$ depicted in FIG. 4.

|  | $S_1$ | $S_2$ | $S_3$ | $S_4$ |
| --- | --- | --- | --- | --- |
| Controlled by CPU 38 | H | H | H | L |
| Controlled by CPU 47 | L | H | H | H |
| Controlled by circuit 57 | L | H | H | L |
| Independent | H | L | L | H |

When the system is controlled by central processing unit 38, central processing unit 47 is electrically disconnected. When the system is controlled by central processing unit 47, central processing unit 38 is electrically disconnected. Upon control by signal switching circuit 57, direct memory access (DMA) is achieved with central processing units 38 and 47 being electrically disconnected. When interface circuits 42 and 51 are disconnected from one another, signals $S_2$ and $S_3$ are automatically put into the low state (L) causing the small-sized portable information device 31 and external station 32 to be electrically disconnected. Signals $S_1$ through $S_4$ are controlled by switching control circuit 57 which effects control in response to the reception and supply of signals from and to central processing unit 47.

It is also possible for an external control device to control the system via signal switching circuit 56. In this case, central processing units 38 or 47 can control the external control device. With the present invention as described above, it becomes easy to program portable information device 31 and data processing can be performed with the system which provides a great advantage over prior art developments.

Since the functions of portable device 31 are controlled by the program in the RAM, the RAM is required to have a large memory capacity for the user's programs and data. With an increased memory capacity and accompanying introduction of other functions, however, the power cell required should also have a large capacity, which results in a large-sized information device. Where the power cell has a reduced capacity, on the other hand, the interval of time for which the small-sized portable information device 31 can be carried around is reduced and frequent cell replacement is needed since it would be likely for the power supply voltage to drop while the device is carried around whereupon the programs and data in the RAM would be destroyed due to a drop in the power supply voltage.

Referring now to FIG. 5, an automatic charging system constructed in accordance with the present invention will be described. Portable information device 31 includes a power supply circuit 60. Portable information device 31 also includes a chargeable cell 61 and a connector 62 forming a part of the interface. External station 32 includes a mating connector 63, also forming a part of the interface, an automatic charging circuit 64 and a power supply circuit 65. Connectors 62 and 63 are automatically connected together when information device 31 is set in and coupled to external station 32 via interface 33 as depicted in FIG. 1.

FIG. 6 further depicts automatic charging circuit 64 of FIG. 5 which includes a voltage detection circuit 66 which, when the voltage of chargeable cell 61 exceeds a reference voltage, supplies a charger circuit 67 with a charging-cease signal to prevent overcharging and automatically charges cell 61 while the user effects program development or the like.

FIG. 7 is block circuit diagram of an arrangement in which a solar cell mechanism is included in small-sized portable information device 31. Power supply circuit 60, chargeable cell 61 and connector 62 are included in the circuit. A charger circuit 68 similar to charger circuit 67 in FIG. 6 is provided as is a solar cell 69. Such an automatic charging system further protects the data in the RAM in portable device 31.

Figure 8:
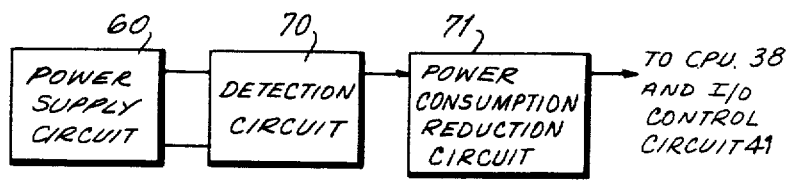
FIG. 8 is a block circuit diagram of a memory protection circuit.

Even with such a system, there is a possibility for RAM data to be destroyed if a certain period of time elapses before device 31 is set in external station 32. FIG. 8 depicts a system in which, when the power supply voltage of device 31 drops below a reference voltage, central processing unit 38 stops functioning and power is applied to hold the data stored in the RAM. A detection circuit 70 detects the power supply voltage which, when the power supply voltage drops below a reference voltage, applies a signal to a power consumption reduction circuit 71 which causes central processing unit 38 in device 31 to stop functioning. This greatly reduces power consumption. At the same time, this status is indicated by display 29 of portable device 31 which indicates to a user to set information device 31 in the external station 32 for recharging. When device 31 is set in external station 32, central processing unit 38 thereof starts to function again. Thus, utilizing the charging and detecting circuits disclosed herein, the possibility that the content of the RAM will be destroyed is reduced to a minimum.

Figure 9A:
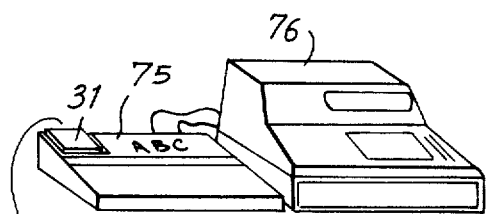
FIG. 9A is a perspective view of an external station, electric cash register and a portable device used in a store.
Figure 9B:
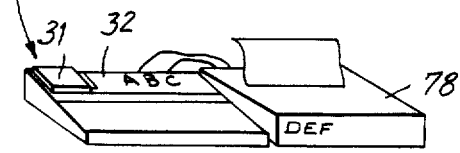
FIG. 9B is a perspective view of a home computer external station and the portable device of FIG. 9A.

Referring now to FIGS. 9A and 9B, an example of use of the above-described system will be explained. In this example, a housekeeping book system will be utilized. An external station 75 is adapted to receive data from an electric cash register (ECR) 76 installed in a store. External station 75 is adapted to transfer relevant data to a portable information device 31 through an interface 33 (not shown) for storage in the RAM. A person who has bought something in the store has the relevant data recorded in the memory of device 31 instead of or in addition to receiving a printed sales receipt in the conventional fashion. Such data collection can also be performed at other stores which have external stations 75. Then, as depicted in FIG. 9B, when the person goes home, device 31 can be set in external station 32 for transfer of the stored data through an interface to the memory of external station 32 for data processing and the results can be printed by a printer 78. The printed data serves as a housekeeping book record.

Another application of the system of the invention is that information device 31 can be used as credit card where the bank account number is stored in the memory thereof and read through the interface by external device 32.

Figure 10:
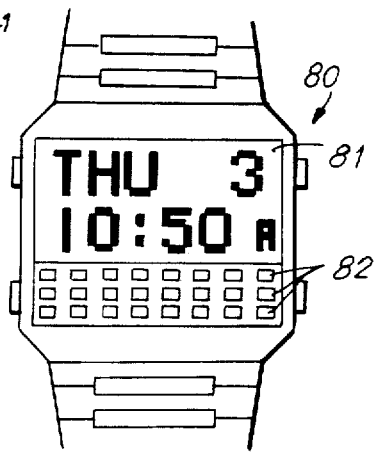
FIG. 10 is a front elevational view of a programmable wristwatch.
Figure 11:
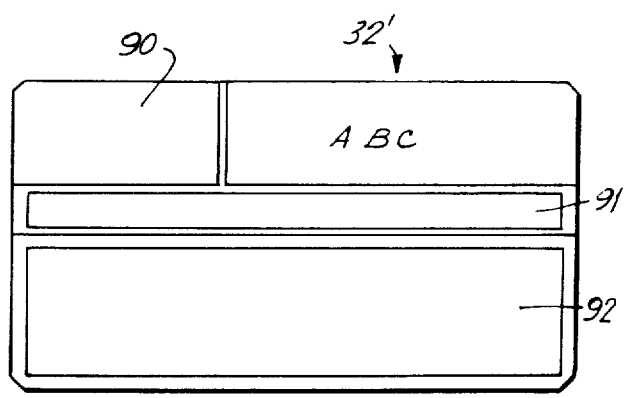
FIG. 11 is a front plan view of an alternative embodiment of a portable device.

FIG. 10 depicts a wristwatch, generally indicated as 80, which can be used as the small-sized portable information device 31 depicted in FIG. 2. Wristwatch 80 includes a display 81 and a plurality of push buttons 82 for entering data in wristwatch 80. As described above with reference to FIGS. 2 and 3 and device 31, wristwatch 80 can similarly be programmed by means of an external station 32' (FIG. 11). External station 32' includes an interface section 90 in which wristwatch 80 is set for programming thereof and data transfer. External station 32' as depicted in FIG. 11, includes a display device 91 and a keyboard 92.

Figure 12A:
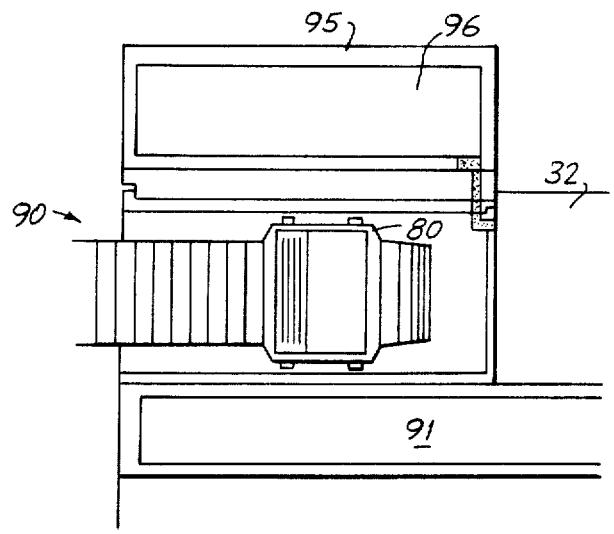
FIGS. 12A, 12B and 12C depict the portable device (wristwatch) of FIG. 10 in the external station and the interface therefor.
Figure 12B:
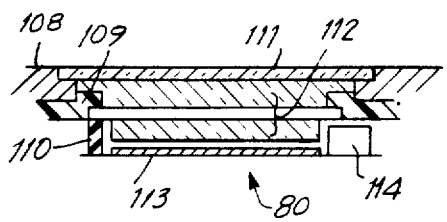
Figure 12C:
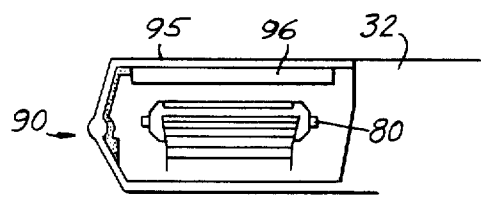

Referring now to FIGS. 12A, 12B, and 12C, the construction of interface section 90 will be described. FIG. 12A depicts the signal transmission side of external station 32' and FIG. 12B shows the signal reception arrangement of the wristwatch-shaped portable information device 80. FIG. 12C shows wristwatch 80 within the interface section of external station 32 for interfacing therewith. Interface section 90 includes a cover 95 which is formed with a light emitting section 96 for transmitting data and programs as light signals for optical interface with wristwatch 80. Wristwatch 80 is set in interface section 90 as depicted in FIG. 12C and cover 95 is closed thereover.

Light emitting section 96 is controlled by the programs in external station 32' so as to emit light only when wristwatch 80 is set in external station 32. Cover 95 is closed for safety and power consumption saving.

Referring to FIG. 12B, the construction of wristwatch 80 will be described. Watch 80 includes an outer casing 108 and a liquid crystal holder 109. Conductive rubber leads 110 are provided for signal transmission between a circuit chip in the watch and liquid crystal panel 112. Wristwatch 80 also includes a cover glass 111, a reflector plate 113 and a light-sensitive element 114.

Light signals from light emitting section 96 are received by the light sensitive element 114 for conversion into electrical signals. Thus, light sensitive element 114 receives light signals when wristwatch 80 is in a signal mode. When in an ordinary mode, that is when the user cannot see the display of the device during night, light sensitive element 114 serves to stop operation of the liquid crystal display. This function allows display operations to cease when the LCD (liquid crystal display), which relies on light as a reception indicator element, cannot be seen in dark environments. Therefore, an LCD such as a dot matrix LCD can be employed as the liquid crystal panel 112. Inclusion of the light-sensitive element 114 is advantageous in that it serves to reduce current consumption. This system can effectively be used for program and data transfer, including, by way of example, automatic time setting based on external data.

Figure 13A:
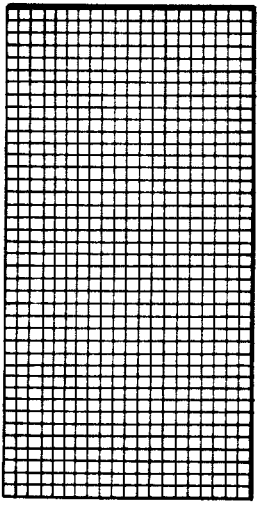
FIGS. 13A through 13I depict the displays of a double-layer liquid crystal display utilized as the liquid crystal panel depicted in FIG. 12B.
Figure 13B:
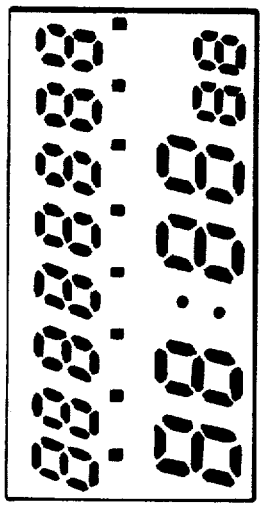

FIGS. 13A through 13I depict examples where the LCD is a double-layer liquid crystal panel 112. As depicted, a first layer of the LCD is a segment display (FIG. 13B) and the other layer is a dot matrix (FIG. 13A). FIG. 13A illustrates the dot matrix pattern on the dot matrix display. FIG. 13B shows the pattern for a seven-segment display. Indications of the double-layer LCD can partly be selected for generating the displays as shown in FIGS. 13C through 13I.

Figure 13C:
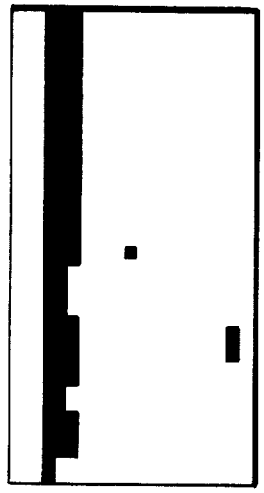
Figure 13D:
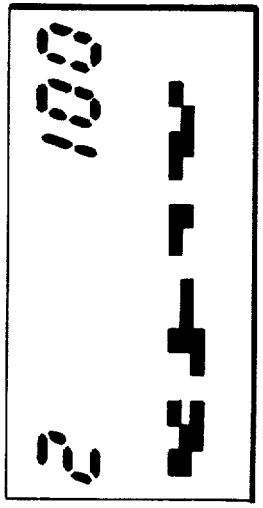
Figure 13E:
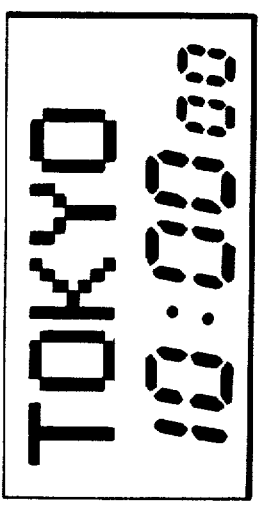
Figure 13F:
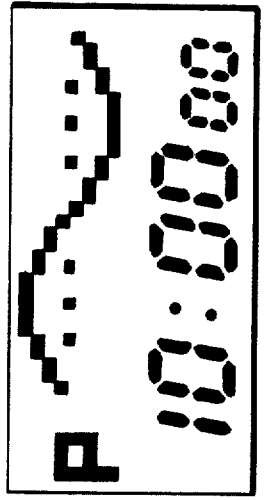
Figure 13G:
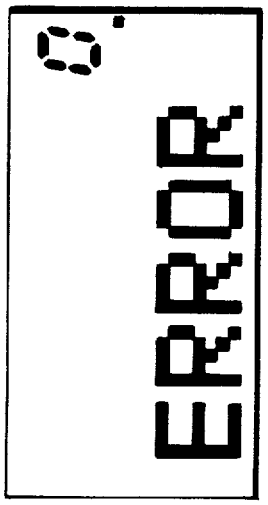
Figure 13H:
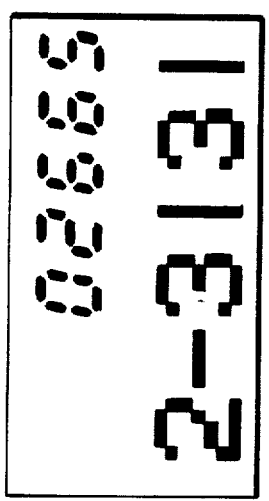
Figure 13I:
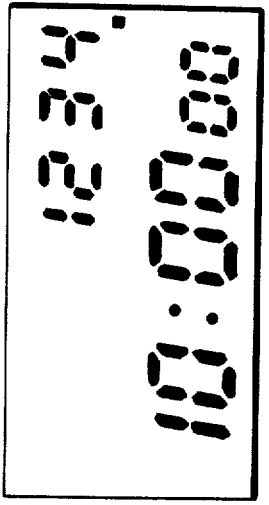

FIG. 13C depicts a game display using the dot matrix on the first panel and FIG. 13D depicts a pattern where the upper half of the display has the seven-segment display and the lower half includes the dot matrix display. FIG. 13E depicts a pattern display where the upper half is the dot matrix and the lower half is the seven-segment display. In FIG. 13E, the upper half indicates a particular country and the lower half indicates the world time in that country. FIG. 13F depicts an alternative pattern to that depicted in FIG. 13E such as a biorhythm. FIG. 13G illustrates a display where the watch is used as calculator with the upper half having a seven-segment display and the lower half having the dot matrix display. FIG. 13H shows the display of a telephone number where the upper half is seven-segment and the lower half is dot matrix. Finally, FIG. 13I depicts a display pattern of a watch with a calculator where the entire area uses the seven-segment display. These displays are selected by a particular program for effecting the indication of seven-segment and dot-matrix display from the standpoint of power consumption savings.

Figure 14A:
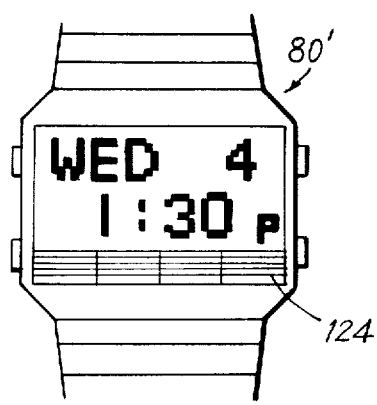
FIG. 14A is a front elevational view of a wristwatch having a speech input and output device.
Figure 14B:
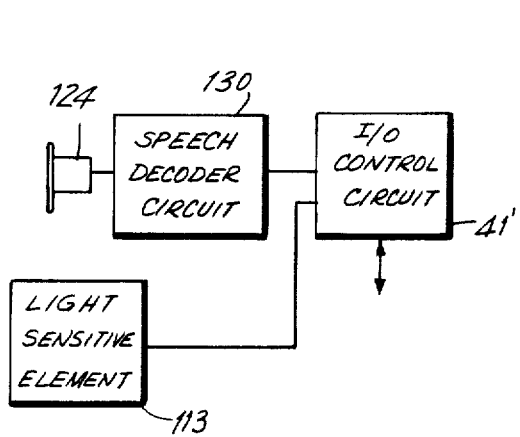
FIG. 14B is a block circuit diagram of the speech input and output circuit of the wristwatch of FIG. 14A.

Referring to FIG. 14A, wristwatch 80' depicted therein includes a speech input and output device 124 contained therein so that information can be transferred thereto without a keyboard being required. Thus, wristwatch 80 can become a small-sized device and can effectively be used as a data collection terminal. Specifically, as shown in FIG. 14B, audio receiver-transmitter 124 is coupled to a speech decoder circuit 130 of conventional design capable of decoding limited speech inputs for application to I/O control circuit 41' which in turn is coupled to a memory, CPU and operational circuit as described above. In addition, a light sensitive element 113 could be coupled to I/O control circuit 41' for interface to an external station 32'.

In view of capacity restrictions, in particular memory capacity in a small-sized portable data processing apparatus or the like, programming languages similar to a machine language or a low-grade BASIC programming language are used in conventional devices. This results in inconvenience in development of programming. As described hereinafter, the present invention eliminates the foregoing difficulties and provides means for enabling the user to program a small-size portable data processing apparatus using higher level languages and also provides a small-sized portable data processing system for effecting data processing for a small-sized portable data processing apparatus.

Figure 15:
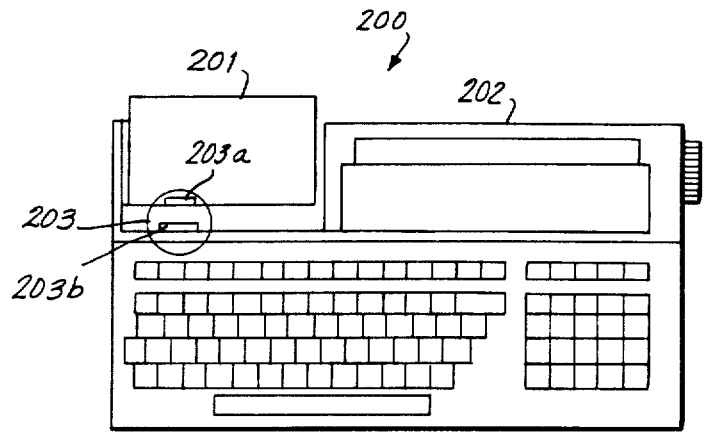
FIG. 15 is a front elevational view of a data processing system including a portable device and an external station.

FIG. 15 depicts an embodiment of a data processing system according to the present invention, generally indicated as 200. The apparatus includes a small-sized portable data processing apparatus 201, an external station 202 for developing programs, for controlling apparatus 201 and for processing data thereof. An optical or electrical interface 203, consisting of interface element 203a on apparatus 201 and interface element 203b on external station 202, for effecting bi-directional transfer of the program and the data between apparatus 201 and external station 202 is also provided.

Figure 16:
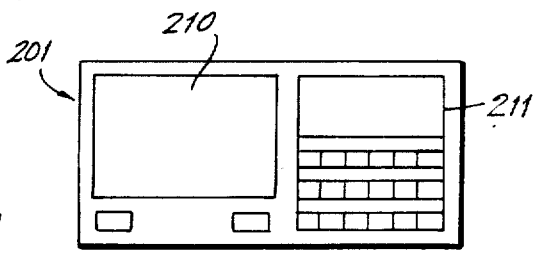
FIG. 16 is a front plan view of the portable device depicted in FIG. 15.

FIG. 16 depicts apparatus 201 which includes an optical display device 210 such as an LED, LCD or the like. An input/output device 211 is provided for effecting the input/output operation of voice audio signals, the output operation of a music signal and the key operated input operation.

Figure 17:
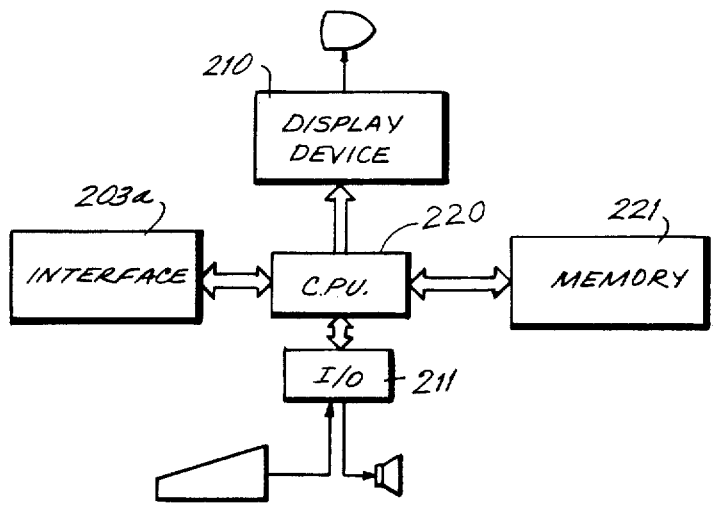
FIG. 17 is block circuit diagram depicting the circuit construction of the portable data processing device depicted in FIG. 16.

Referring now to FIG. 17, the operational construction of portable apparatus 201 will be described. A central processing unit (CPU) 220 operates to read the program stored in a memory 221 and then controls apparatus 201 in accordance therewith. The control of an interface element 203a, a display device 210 and an input/output device 211 are also carried out by CPU 220 in accordance with the program. More specifically, basic control subroutines are stored in a ROM in memory 221 and the user prepares and stores a main routine for calling up the subroutines from a RAM in memory 221. Therefore, the user can easily prepare a control program for controlling interface element 203a, display device 210 and input/output device 211, and change the functions of apparatus 201 by preparing the above described main routine. Such a control program can be developed and prepared by external station 202 after coupling apparatus 201 to interface element 203b of external station 202.

Figure 18:
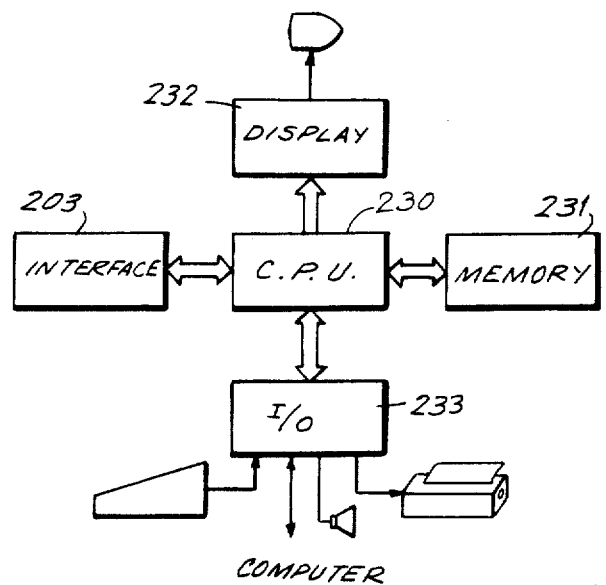
FIG. 18 is a block circuit diagram depicting the circuit construction of the external station depicted in FIG. 15.

FIG. 18 depicts the operational construction of external station 202. A central processing unit 230 operates to read a control program stored in a memory device 231 so as to control the functions of external station 202. Station 202 includes a display device 232 such as an LCD or an output circuit for controlling a cathode ray tube (CRT). An input/output device 233 includes an apparatus for carrying out a data input/output operation to the other electronic devices such as printers, a computer and the like and an input device such as a keyboard.

Figure 19:
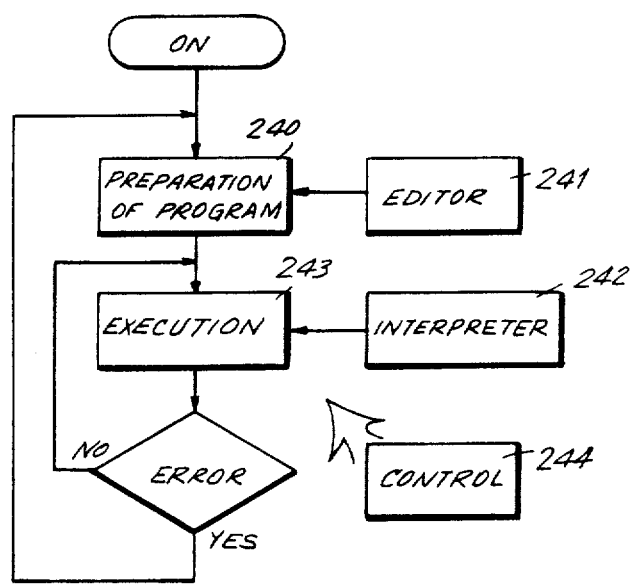
FIG. 19 is a flow chart used for explaining the preparation of a program in a conventional electronic desk type calculator.

FIG. 19 is flow chart which shows an example of preparing a program for a conventional electronic desk type calculator capable of preparing its control program and carrying out the control program. According to the flow chart, a source program is prepared at first step 240. In this case, an editor 241 is required to produce a support program. After the preparation of the source program in the conventional electronic desk type calculator the program is inputted by the use of either a machine language or a low-grade BASIC language. However, the machine language is disadvantageous in that it does not meet the user's requirement in developing and debugging the program, and therefore machine language is not suitable for practical use. Consequently, a BASIC language has been used as programming language. An example of the conventional system using the BASIC language will be described hereinafter.

The preparation of the source program is completed whereafter the program execution step 243 is carried out in accordance with a BASIC interpreter 242. In this case, due to the interpreter system, the program running speed is relatively low which results in the speed not being at a level sufficient for practical use. In addition, an additional control program 244 is needed in order to store the prepared program on a cassette. As is apparent from the above, the conventional system is disadvantageous in that the additional programs 241, 242 and 244 are required to be stored in a memory region contained in the small-sized portable apparatus and the functions of programs 241, 242 and 244 are thus restricted. Further, the region in the memory device which is programmable by the user may also be restricted.

In general, although the preparation and running of the program can be simultaneously carried out at the step of preparing the program, after completing of the program, there is almost no possibility that the completed program can be practically run and modified repeatedly. Therefore, editor 241 and the like are not necessary for the small-sized portable apparatus during running of the program.

Figure 20:
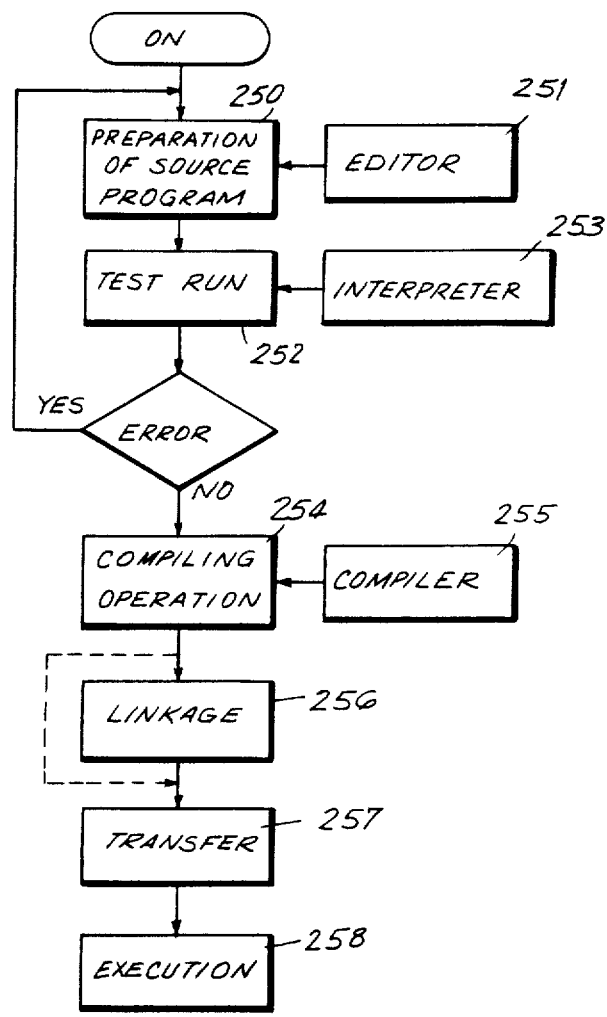
FIG. 20 is a flow chart for explaining the preparation and running of program according to the present invention.

FIG. 20 is a flow chart for preparing and running a program according to the present invention which is intended to eliminate the above described drawbacks accompanying the conventional systems. According to the flow chart shown in FIG. 20, the small-sized portable data processing apparatus 201 is coupled through interface 203 to external station 202 so that a source program is prepared at step 250. In this case, central processing unit 220 contained in apparatus 201 is electrically isolated (in hardware) and the respective devices contained in apparatus 201 are thus controlled by central processing unit 230 contained in external station 202. In step 250, the preparation of the source program is supported by an editor program 251 in external station 202. Subsequently, the thus obtained program is test-run in step 252. Since a primary object of step 252 is to test-run the source program, a BASIC interpreter 253 is provided in external station 202 that operates to run the source program in practical use. As a result, each of the devices contained in apparatus 201 is operated in accordance with the program under the control of CPU 230. Thus, as a result of the test-running of the source program at step 252, in case of an error, flow is returned back to step 250 in which the source program is subjected to an editing treatment or modification to be subjected to the test-running again.

When the source program is completed in the above-mentioned manner, the source program thus obtained is subjected to compiling operations at step 254 thereby resulting in the source program becoming an object program. The region in the memory device occupied by the object program is very small compared with the source program. While a BASIC compiler 255 operates to compile the source program, the thus obtained object program is the same as that obtained by interpreter 253 during the test-running at step 252.

In the above-described manner, the source program is transformed to the object program. In this case, programs 251, 253 and 255, the source program and the object program may be stored in the memory device as contained in external station 202. Hence, the restriction with respect to the capacity of the memory device in apparatus 201 is not imposed and it is further possible to rapidly develop programs having a variety of functions with reference to the support program. Moreover, external station 202 can be provided with an interface having a cathode ray tube (CRT), a floppy disk and the like, and the keyboard can have a standard size that can be readily used so that it is possible to develop the programs more easily. If desired programs 251, 253 and 255 could be stored in apparatus 201 but a larger memory would be required for this purpose.

In the case where the object program does not meet the requirements for loading in apparatus 201 after the completion of the program, it is subjected to a linkage treatment at a step 256 and thereafter is transferred to the memory region of apparatus 201 at a step 257. This results in the apparatus 201 being electrically isolated so that the apparatus can be controlled in accordance with the thus obtained control program. It should be noted that, in this case, a running step 258 performed in apparatus 201 is not associated with the interpreter system and running at step 258 is carried out more rapidly compared with that at step 243 depicted in FIG. 19.

While the above description is concerned with a system using BASIC as a program language, interpreter 253 and BASIC compiler 255 may employ other program languages such a PASCAL, C instead of the BASIC language as a program language. Furthermore, the control program of the small-sized portable data processing apparatus 201, which is prepared by the user, functions in apparatus 201 as a basic control program for a variety of arithmetic operations, a clock, a timer, a counter, a key input, a display device and the like. Therefore, it is possible to prepare a simple call program in BASIC program language for function selection. Moreover, since a predetermined standard control program for controlling apparatus 201 has been pre-prepared and stored in a ROM in apparatus 201 in the form of a similar type call program, it can be used selectively with the control program prepared by the user. With respect to the external station 202, it is provided with an interface which is to be coupled to a personal computer of the type which has come into wide use recently. The interface may be an interface which is capable of carrying out the function of the above described external station and the function of a personal computer. It should be noted that external station 202 may be replaced by a personal computer capable of being independently associated with the portable apparatus 201 of the system.

According to the data processing system of the present invention, it is possible to achieve varying functions in a small-sized portable data processing system by externally preparing the programs so that the functions performed meet the user's requirement. Specifically, by way of example, a program in which the time table of a bus or a train schedule is memorized in advance and then this stored data is linked to an alarm or clock or watch may be prepared in the external station 202 and fed to the apparatus 201. Further, a game program and a program for an address list and a dictionary can be easily developed and prepared. Moreover, as described above, a program permitting the attachment of the interface of the portable apparatus 201 to a cash register to in turn permit the memorizing of the content and cost of each of the purchases in apparatus 201 and the feeding of such data to an external station 202 so as to provide a printout thereof and permit the preparation of a housekeeping account book can also be readily developed and prepared. Additionally, in order to change functions, the program can be very easily changed according to the user's requirement. Because there is no need to provide the small-sized portable data processing apparatus with programs for developing programs and the key input mechanism, miniturization thereof and minimization in power consumption can be realized in accordance with the present invention.

Figure 21:
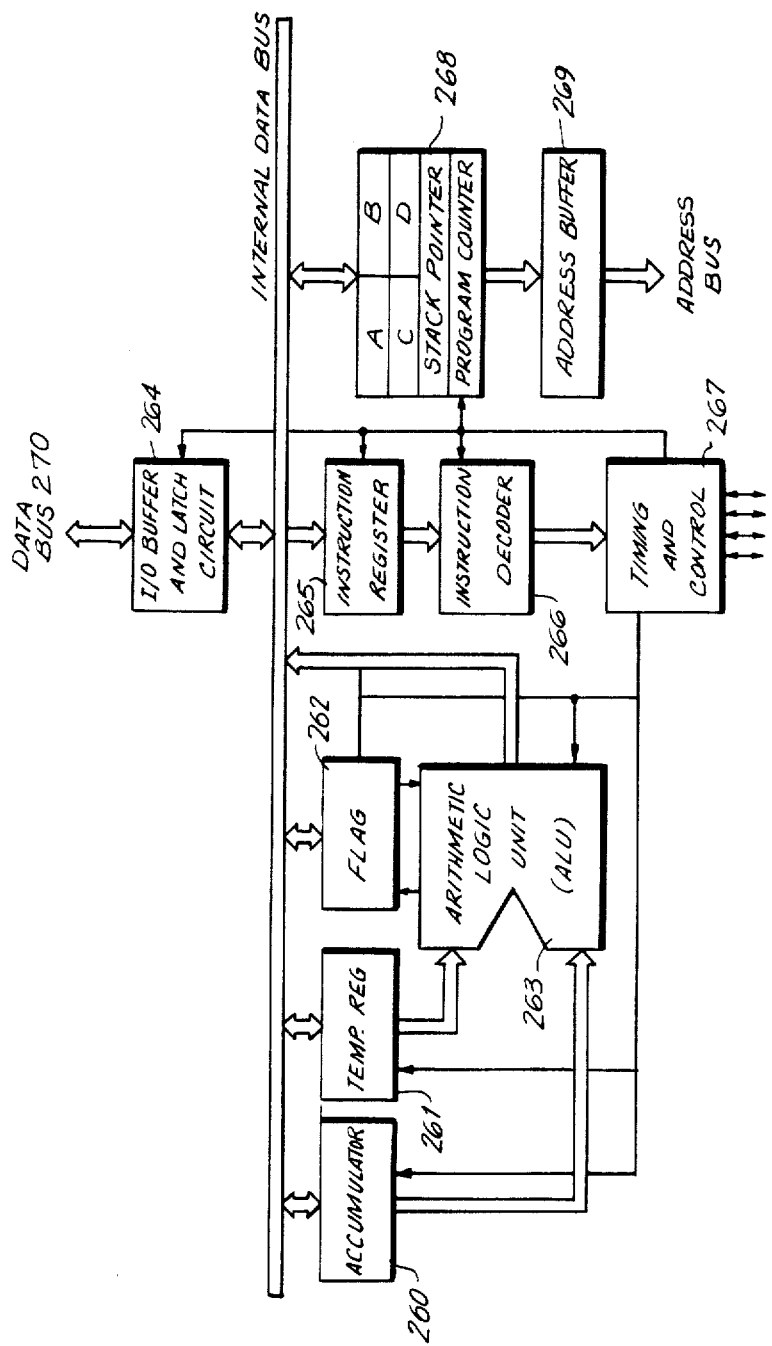
FIG. 21; is a schematic diagram depicting the fundamental construction of the central processing units of the external station and the portable device.

Referring now to FIG. 21, a fundamental circuit construction of central processing units 220 and 230 will be described. The CPUs include an arithmetic register (accumulator) 260, a holding register (temp. reg.) 261 and a flip-flop circuit (flag) 262 for flaging. Flip-flop circuit 262 holds flags or the like which are to be selectively set or reset in accordance with the result of an operation of an arithmethic logic unit (ALU) 263. The CPU's also includes an input-output buffer and latch circuit 264 for a data bus 270, an instruction register 265, instruction decoder 266, a timing and control circuit 267 for the CPU, a register 268 and an address buffer 269.

The CPU operates first to produce an address signal from the address buffer 269 taken from register 268 and then to read out the data from the I/O buffer and latch circuit 264. Thereafter, the thus obtained data is latched by the instruction register 265 and is decoded by the instruction decoder 266 so that the timing and control circuit 267 may control the operations of the other circuits and components in accordance therewith.

The present invention provides a small-sized portable data processing system which has multi-function capability and a wide range of practical use. As a result, the results obtained thereby are remarkably significant. Specifically, a portable programmable device in the form of a wristwatch, credit card calculator or the like can be provided which can be programmed in an external computer station such as home personal computer. Depending upon the user's requirements, a plurality of programs can be programmed in a portable device which carries out the required functions.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A small-sized portable information system comprising a small-sized portable programmable information device including a first central processing unit, first memory means coupled to said first central processing unit for storing programs and data, first display means coupled to said first central processing unit, first input means coupled to said first central processing unit for the actuation thereof and a first power supply coupled to said first central processing unit, first memory means, first display means and first input means for powering same; a first external station including a second central processing unit, second memory means coupled to said second central processing unit for storing programs and data, second display means coupled to said second central processing unit, second input means coupled to said second central processing unit for the control thereof and a second power supply coupled to said second central processing unit, second memory means, second display means and second input means for powering same; said first external station being adapted to receive a source program, said first external station including compiler means for compiling said source program, said source program being compiled by said compiler means and converted into an object program; an interface means including a first interface means portion mounted on said portable information device and a second interface means portion mounted on said first external station, said first and second interface means portion being adapted, when coupled, to permit the transfer of said object program from said first external station to said first memory means of said portable information device to program said portable information device to perform said object program, and to permit the transfer of a plurality of data including alpha-numeric characters from said first external station to said first memory means of said portable information device, said portable information device being a wristwatch which includes timekeeping circuitry means for keeping actual constant time.

2. The small-sized portable information system as defined in claim 1, wherein said interface means is adapted to permit bi-directional transfer of a program and data between said portable information device and said first external station.

3. The small-sized portable information system as defined in claim 1 or 2, wherein said first memory means of said portable information device includes a RAM for receiving data or a program from said external station.

4. The small-sized portable information system as recited in claim 1 or 2, wherein said first external station is adapted to permit development and modification of a program for transfer to said portable information device.

5. The small-sized information system as recited in claim 1 or 2, wherein both said portable information device and said first external station include first and second signal switching circuit means and a data bus, the respective first and second memory means, display means and input means of said portable information device and said first external station being coupled to the respective data bus thereof, the respective first and second central processing units of both said portable information device and first external station being coupled to the data bus thereof through the associated second signal switching circuit means and said first and second interface means portions being respectfully coupled through the associated first signal switching circuit means to the associated data bus, said first external station including a signal switching control circuit means coupled to the second central processing unit of said first external station for actuation thereby and coupled to said first and second signal switching circuit means of said first external station for control thereof, said signal switching control circuit means being further coupled through said interface means to said first and second signal switching circuit means of said portable information device for control thereof, whereby said second central processing unit of said first external station can selectively control the operation of said first external station and portable information device to permit direct data access from one to the other.

6. The small-sized portable information system as recited in claim 1 or 2, wherein said power supply of said portable information device includes a chargeable cell coupled to said first interface means portion and said first external station includes automatic charging circuit means coupled to said second interface means portion, whereby when said first and second interface means portions are coupled together, said chargeable cell will be automatically charged by said automatic charging circuit means.

7. The small-sized portable information system as recited in claim 6, wherein said automatic charging circuit means includes voltage detection circuit means for detecting the voltage of said chargeable cell and for actuating said automatic charging circuit means only in response to a detected voltage below a predetermined level.

8. The small-sized information system as recited in claim 6, wherein said portable information device includes voltage detection circuit means coupled to said chargeable cell for detecting the voltage thereof and power consumption reduction circuit means coupled to said central processing unit and said voltage detection circuit means for selectively reducing the power applied to the components of said portable information device when said chargeable cell voltage is reduced to a predetermined level to maximize the duration of application of power to said first memory means of said portable information device.

9. The small-sized portable information system as recited in claim 2, and including a second external station having a third central processing unit, third memory means coupled to said third central processing unit, third display means coupled to said third central processing unit, input/output means coupled to said third central processing unit and a third power supply coupled to power said third central processing unit, third memory means, third display means and input/output means, said second external station further including a third interface means portion adapted to apply data to said portable information device when the first interface means portion thereof is coupled to the third interface means portion of said second external station, said portable information device being adapted to transfer the data thus received to said first external station when the second interface means portion thereof is coupled to the first interface means portion of said portable information device.

10. A small-sized portable information system as recited in claim 2, wherein said portable information device is a portable data processing apparatus, said first external station being adapted to transfer a control program to the memory means of said portable data processing apparatus and to process data received from said portable data processing apparatus.

11. A small-sized portable information system as recited in claim 10, and including peripheral device means coupled to said first external station, said first external station being adapted to perform data input/output processing with respect to said peripheral device means.

12. A small-sized portable information system comprising a small-sized portable programmable information device including a first central processing unit, first memory means coupled to said first central processing unit for storing programs and data, first display means coupled to said first central processing unit, first input means coupled to said first central processing unit for the actuation thereof and a first power supply coupled to said first central processing unit, first memory means, first display means and first input means for powering same; a first external station including a second central processing unit, second memory means coupled to said second central processing unit for storing programs and data, second display means coupled to said second central processing unit for the control thereof and a second power supply coupled to said second central processing unit, second memory means, second display means and second input means for powering same; said first external station being adapted to receive a plurality of data including alpha-numeric characters through said second input means; an interface means including a first interface means portion mounted on said portable information device and a second interface means portion mounted on said first external station, said first and second interface means portions being adapted, when coupled, to permit the transfer of said plurality of data including alpha-numeric characters from said first external station to said first memory means of said portable information device, said portable information device being a wristwatch which includes timekeeping circuitry means for keeping actual constant time.

13. The small-sized portable information system as claimed in claims 1 or 12, wherein said first external station is programmed to receive a plurality of names and telephone numbers, said names and telephone numbers being transferred through said interface means to said first memory means of said portable information device, said plurality of names and telephone numbers being selectively displayed on said first display means of said portable information device.

14. The small-sized portable information system as claimed in claims 1 or 12, wherein said first external station is programmed to receive a mass transit schedule, a list of addresses and messages, said mass transit schedule, list of addresses and messages being transferred through said interface means to said first memory means of said portable information device, said mass transit schedule, list of addresses and messages being selectively displayed on said first display means of said portable information device.

* * * * *